United States Patent [19]

Sellnau

[11] Patent Number: 4,969,352

[45] Date of Patent: Nov. 13, 1990

[54] COMBUSTION PRESSURE SENSOR

[75] Inventor: Mark C. Sellnau, Bloomfield Hills, Mich.

[73] Assignee: General Motors Corporation, Detroit, Mich.

[21] Appl. No.: 492,204

[22] Filed: Mar. 12, 1990

Related U.S. Application Data

[63] Continuation of Ser. No. 396,156, Aug. 21, 1989, abandoned.

[51] Int. Cl.$^5$ ............................................. G01M 15/00
[52] U.S. Cl. ....................................................... 73/115
[58] Field of Search .................... 73/35, 115, 700, 753, 73/756, DIG. 4, 115

[56] References Cited

U.S. PATENT DOCUMENTS

| | | | |
|---|---|---|---|
| 3,939,703 | 2/1976 | Heggie | 73/115 |
| 4,153,019 | 5/1979 | Laubenstein et al. | 123/425 |
| 4,408,483 | 10/1983 | Bollinger et al. | 73/115 |
| 4,491,010 | 1/1985 | Brandt et al. | 73/114 |
| 4,524,625 | 6/1985 | Takeuchi | 73/115 |
| 4,559,821 | 12/1985 | Engeler et al. | 73/756 |
| 4,566,316 | 1/1986 | Takeuchi . | |
| 4,601,197 | 7/1986 | Frelund | 73/115 |
| 4,602,506 | 7/1986 | Sawamoto et al. | 73/115 |

Primary Examiner—Robert Raevis
Attorney, Agent, or Firm—Robert M. Sigler

[57] ABSTRACT

This invention is an annular sensor that measures combustion chamber pressure in an internal combustion engine. The sensor is located in an engine component opening, such as a spark plug well, and is engaged with first and second walls that define the ends of the opening. The first wall is located near the combustion chamber and flexes in response to varying combustion chamber pressure. The second wall is located away from the combustion chamber and remains relatively rigid. Movement of the first wall relative to the second wall due to varying combustion chamber pressure transmits a load to the sensor. The sensor generates an output signal that corresponds to that load which may subsequently be used to control engine functions.

8 Claims, 2 Drawing Sheets

COMBUSTION PRESSURE SENSOR

This application is a continuation of U.S. Ser. No. 07/396,156, filed Aug. 21, 1989, now abandoned and assigned to the assignee of this application.

BACKGROUND OF THE INVENTION

It is helpful in the operation of internal combustion engines to know the pressure in a combustion chamber, and more specifically in an engine cylinder. For example, this pressure can be used to control ignition timing, thus allowing the engine to obtain better fuel consumption results. Combustion chamber pressure can also be used to detect engine knock.

It is known in the art that a pressure sensing device, such as a piezoelectric force ring, may be used to indicate combustion chamber pressure. A description illustrating such an arrangement is found in U.S. Pat. No. 4,153,019 to Laubenstein et al, issued May 8, 1979. In the disclosure of that patent a cylinder head bolt secures a force ring to the engine. This enables the force ring to detect loads that are transferred to the cylinder head bolt through the cylinder head as a result of combustion chamber pressure.

Although force rings secured under head bolts can detect loads acting on the cylinder head as a result of combustion chamber pressure, they also detect extraneous forces, such as thermal expansion and external shock or inertia loads. This event often occurs when the extraneous forces are of comparable magnitude to the load being measured from combustion chamber pressure. Consequently, these extraneous forces must be filtered away so that the sensor provides a clean output signal. Thermal stress, which has low frequency characteristics, is easily filtered away without affecting the signal. Filtering high frequency shock noise, however, introduces a phase lag that may cause inaccuracies in the timing of engine control operations. In addition, such an arrangement provides a signal that is non-linear due to the lack of elasticity of the head gasket, which is variably loaded as combustion chamber pressure moves the engine head relative to the engine block. It is therefore desirable to provide a linear pressure sensing arrangement which, compared to a headbolt sensor, is comparably more sensitive to combustion chamber pressure than to extraneous forces, is more linear, and introduces no phase or time lag.

An advancement toward that goal is shown in the sensor of U.S. Pat. No. 4,601,196 to Frelund, issued July 22, 1986. The sensor of the Frelund patent utilizes a pressure sensing device that has a main body and a probe. The probe engages a wall that flexes in direct response to varying combustion chamber pressure. The body engages a different wall that is relatively fixed. The result is that when combustion chamber pressure changes, the probe will move relative to the body and thus generate a signal. This type of arrangement may be implemented through a coolant passage of the engine cylinder head, with the body retained in an upper wall and the probe extending through the coolant passage to a lower wall forming part of the combustion chamber. If the sensor is properly placed, the relative motion between the upper and lower walls due to varying combustion chamber pressure places a load on the sensor that is much greater than any loads caused by extraneous forces. This greatly increases the signal to noise ratio of the sensor output.

It is preferable, however, that the sensor is placed near the center of the cylinder relative to the other cylinders. This location produces a stronger signal than other locations because the cylinder head wall flexes more near the center than at the sides. Additionally, this location also produces a linear signal that is free from interference from adjacent cylinders. In some situations, however, the sensor described in the Frelund patent cannot be placed near the center of the cylinder. A common example illustrating this point is an engine having four valves for each cylinder with a spark plug opening centrally located between the valves. This would require using an alternate location which would provide a weaker signal and might subject the sensor to interference from adjacent cylinders. Thus, it is advantageous to have a sensor that can be placed near the center of the cylinder in these situations.

One arrangement in the prior art that can be used to locate a sensor near the center of a cylinder is described in U.S. Pat No. 4,602,506 to Sawamoto et al, issued July 29, 1986. The Sawamoto et al patent shows an arrangement where an annular pressure sensor is clamped to a spark plug seat by the spark plug itself. However, although the spark plug may be centrally located at the top of the combustion chamber, the Sawamoto et al sensor measures the strain that is placed on the spark plug threads rather than the movement between a wall subject to combustion chamber pressure and a fixed wall. This arrangement, then, does not provide the advantages of the aforementioned Frelund et al sensor. In particular, its output is lower and tends to be non-linear. In addition, the annular sensing element is loaded by the spark plug itself. Therefore it must work with the same axial preload and is further subject to torsional loads by the rotation of the spark plug. It is also a burden to have the sensing arrangement disturbed when a spark plug has to be replaced.

Therefore, in conclusion, it is desirable to have a combustion chamber pressure sensing arrangement located where combustion chamber pressure loads are of much greater magnitudes than the surrounding extraneous forces. Ideally, the sensing arrangement should be placed near the center of the cylinder to insure that the sensor produces a strong linear signal and is minimally influenced by adjacent cylinders. Furthermore, the sensing element should be easy to install, separated from other engine components for independent operation and servicing, and free from torsional loads that may cause the failure of the sensor.

SUMMARY OF THE INVENTION

The present invention involves the application of a combustion pressure sensing device of the type shown in Frelund et al in an engine component, or more particularly, in an engine cylinder head. Structurally the cylinder head has a first wall defining a portion of a combustion chamber. The first wall has a mounting boss and is capable of flexing in response to varying combustion chamber pressure. Thus, when combustion chamber pressure varies, a load is transferred through the first wall. A distance away from the first wall is a second wall. The second wall has an opening; but, in contrast to the first wall, the second wall remains relatively rigid when combustion chamber pressure varies. The first wall mounting boss and second wall opening are connected by a annular wall which defines an access well for the mounting boss.

The sensor is mounted in the access well, and is comprised of two main elements, an annular insert and an annular load sensing element. The annular insert secures the sensor in the access well and retains the annular load sensing element for axial loading between the first and second walls in parallel with at least an axially compressible portion of the annular wall. The load produced by combustion chamber pressure is thus transferred through the first wall and split between the annular wall and the sensor. The part of the load transferred through the sensor is applied by the annular insert axially to the annular load sensing element. Consequently, the annular load sensing element receives a predetermined portion of the combustion chamber pressure load and thus provides an output signal of combustion chamber pressure.

In a preferred example, the engine has a spark plug access well centrally located at the top of each cylinder. Thus, some advantages over the prior are evident. First, the output signal produced is strong and linear because the sensor is located near the center of the cylinder, where the flexing of the first wall is greatest. The annular load sensing element also generates a signal that is free from adjacent cylinder interference. The sensor, although located in the spark plug access well, is not physically in contact with the spark plug. Thus, its operation and service are independent of the spark plug. This invention is easily implemented in existing engine structures with only minimal extra machining operations required. Finally, although this invention can be considered in many ways a special case of the sensor arrangement shown in the Frelund patent, it has an advantage over the embodiment shown in that patent in that it does not require breaching a coolant chamber wall.

These and other features and advantages of the invention will be more fully understood from the following description of certain preferred embodiments, taken together with the accompanying drawings.

DETAILED DESCRIPTION OF A PREFERRED EMBODIMENT

Figure 1:
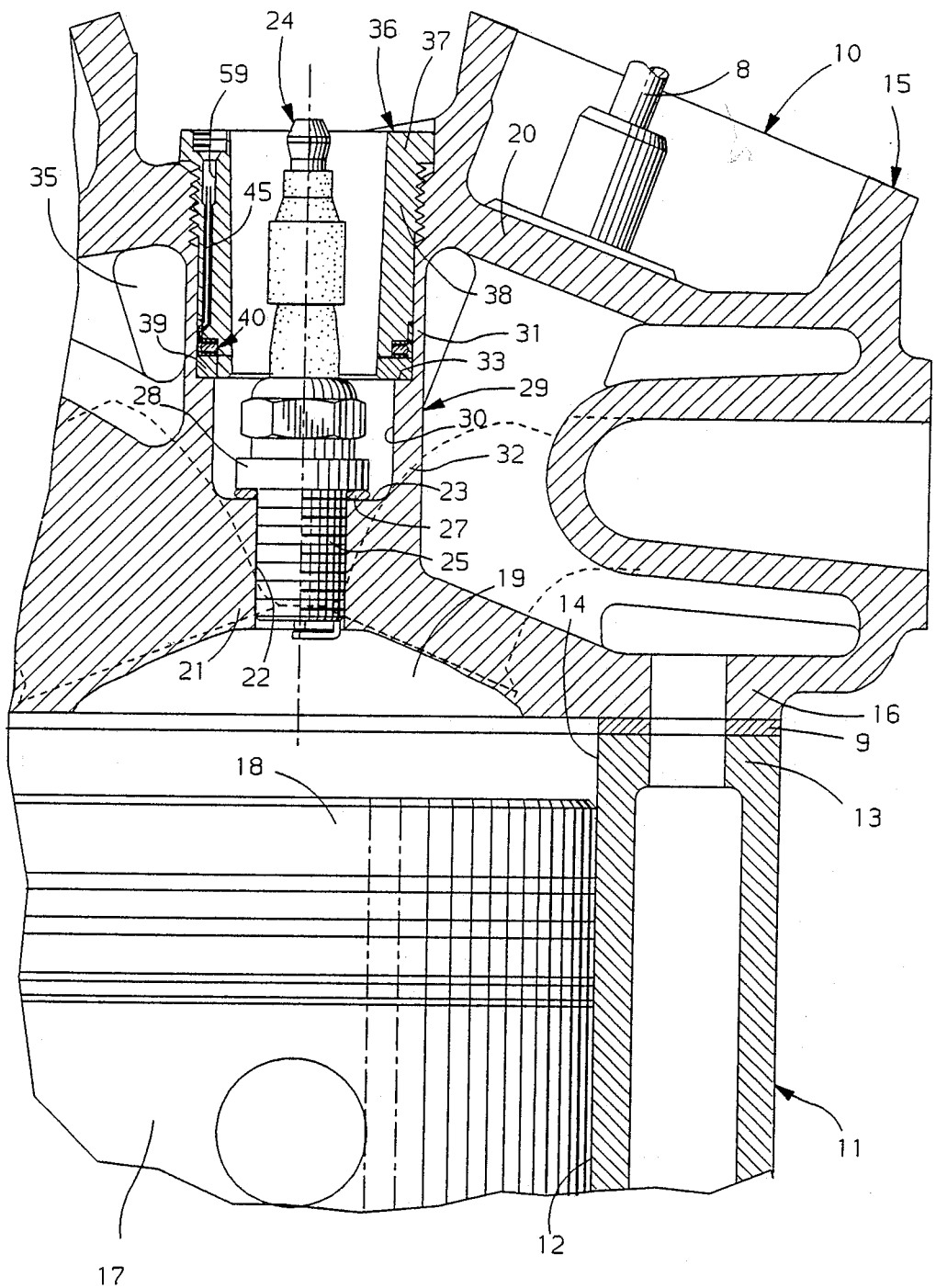
FIG. 1 is a transverse cross-sectional view of a portion of an engine illustrating a combustion chamber pressure sensor in accordance with the invention.

Referring first to FIG. 1 of the drawing, there is shown an internal combustion engine generally indicated by numeral 10. Engine 10 includes a cylinder block 11 having one or more cylinders 12. Cylinder block 11 has an upper wall 13 having openings 14 at the top of cylinders 12.

A cylinder head 15 is attached to block 11 by headbolts, not shown, in the usual manner. Cylinder head 15 has a lower wall 16 seated on block upper wall 13 with a standard engine headgasket 9 located therebetween. Located in each cylinder 12 is a piston 17. Cylinder head lower wall 16 extends over and closes opening 14 of each cylinder 12, while a piston upper portion 18 closes an opening at the lower end of each cylinder 12. Together, cylinder head lower wall 16 and piston upper portion 18 define a combustion chamber 19 for each respective cylinder 12. Cylinder head 15 also houses intake and exhaust valves 8 which allow fuel mixture to enter and exhaust gases to exit combustion chamber 19. Cylinder head 15 may be made of aluminum or steel in the normal manner.

Cylinder head 15 further has an upper wall 20. Cylinder head lower wall 16 includes a mounting boss 21. Mounting boss 21 has an opening 22 threaded to receive a spark plug. Mounting boss 21 further has an upper portion that forms a spark plug seat 23. A spark plug 24 has a lower portion 25 threadably retained in opening 22 and a radially wider portion 28 which engages seat 23 in the normal manner through a standard gasket 27. An upper annular wall 31 is joined to and extends downward form cylinder head upper wall 20. A lower annular wall 32 extends upward from mounting boss 21 and engages upper annular wall 31. Upper annular wall 31 and lower annular wall 32 together form a combined annular wall 29 which defines a spark plug access well or opening 30. Upper annular wall 31 is radially thinner than lower annular wall 32, and a shoulder therebetween thus defines an annular seat 33 within access well 30. Located to the outside of annular wall 29 is a coolant passage 35.

As previously mentioned, spark plug 24 is secured in mounting boss opening 22 at the bottom of access well 30. A sensor 36 that measures combustion chamber pressure is also located in access well 30 but does not engage spark plug 24. This is an advantage over the prior art because a different torque may be applied to each component during installation. Sensor 36 comprises an annular insert 37. In a preferred embodiment, annular insert 37 is comprised of a stiff material such as stainless steel. A high stiffness to mass ratio is required because that characteristic provides the best output signal and also aids in high frequency response. If annular insert 37 is comprised of the same material as cylinder head 15, an advantage is obtained in that annular insert 37 and cylinder head 15 may respond similarly to changes in thermal conditions and thus reduce the need to filter out thermal effects in the sensor output signal. However, this is not a requirement of the invention; the stiffness to mass ratio mentioned above is more important. Thus, annular insert 37 is made of steel whether cylinder head 15 is steel or aluminum. With regard to the stiffness to mass ratio, a spark plug boss and access well, particularly if centrally located at the top of the cylinder, appears to provide a highly favorable such ratio for strong high frequency response with minimal phase lag due to its low equivalent mass.

Figures 2, 3:
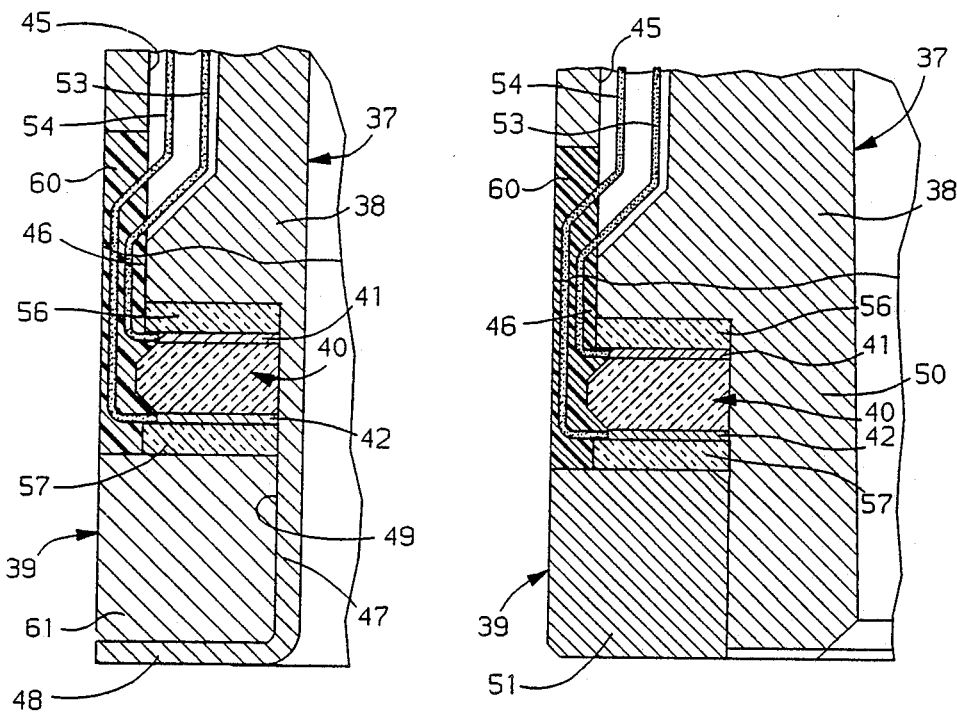
FIG. 2 is a cross-sectional view of a lower portion of the combustion chamber pressure sensor showing an embodiment of the present invention.
FIG. 3 is a cross-sectional view similar to FIG. 2 and showing an alternative embodiment.

Annular insert 37 has an upper portion 38 that threadably engages cylinder head upper wall 20 to secure sensor 36. A torque of 25 to 50 ft.-lbs. should be applied to annular insert 37 for full engagement to essentially eliminate non-linearities in the output signal due to thread compliance. Comparing this to a typical 17 ft.-lbs. applied to a spark plug, one may see the advantage in the separation of the sensor from the spark plug in allowing separate torques for optimization of each. Annular insert 37 also has a lower portion 39 that engages annular seat 33. Annular insert 37 holds a known annular load sensing element 40: in particular, a piezoelectric device. Annular load sensing element 40, as shown in FIGS. 2 and 3, has electrically conductive electrodes 41 and 42 on its upper and lower surfaces between which a load related voltage is generated. Annular load sensing element 40 is retained between annular insert upper portion 38 and annular insert lower portion 39, with electrically insulating annular ceramic spacers 56 and 57, so as to be axially loaded by combustion chamber pressure. In situations when torque is applied to sensor 36, such as when it is being installed in or removed from access well 30, annular insert 37 reduces the torque on annular load sensing element 40 by transferring at least a portion of the torque axially past element 40, in a manner to be described. Variations of this invention, however, may provide that annular load sensing element 40 engage annular seat 33. Furthermore, it should be understood that other axially loaded sensing devices may be adapted for use in this application.

Figure 4:
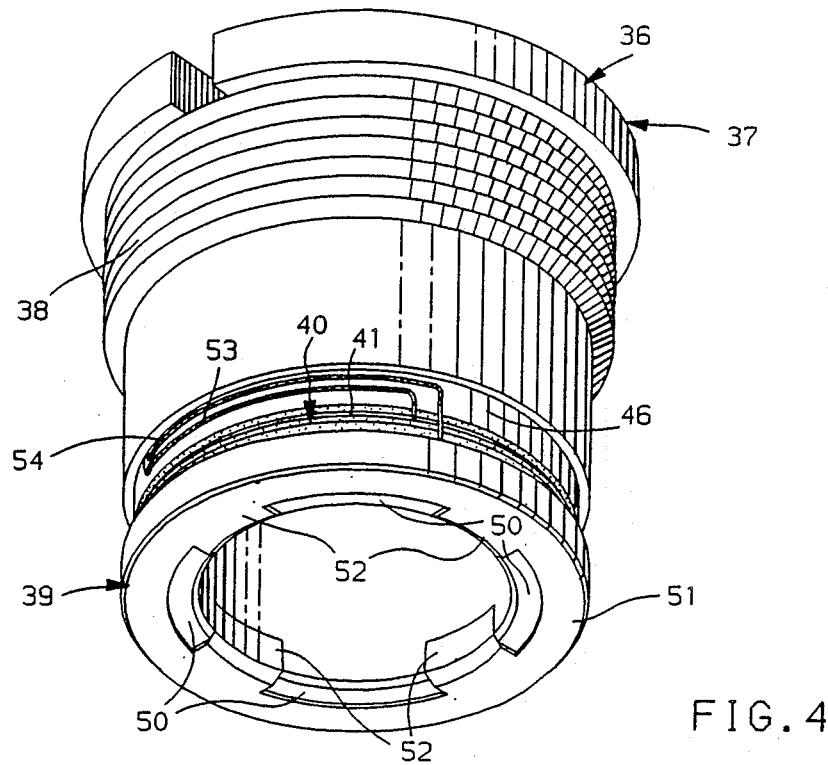
FIG. 4 is a perspective view of the combustion chamber pressure sensor in accordance with the invention.

Annular load sensing element 40 also has wires 53 and 54 attached to electrodes 41 and 42 on its upper and lower surfaces, such as by soldering, for transmitting the output voltage signal. Part of wires 53 and 54 are housed in an axial channel 45 inside annular insert 37. FIG. 4 shows the remaining portion of wires 53 and 54 wrapped around an indented annular channel 46 of annular insert 37. Wires 53 and 54 lead up to a connector, not shown, which is housed in a chamber 59 at the upper end of channel 45. In assembling the unit, the connector may be affixed to the ends of wires 53 and 54 outside the unit; and wires 53 and 54 may then be pulled downward through channel 45 so as to pull the connector into chamber 59. Annular load sensing element 40 may then be rotated so that the excess lengths of wires 53 and 54 are wrapped around annular insert 37 within annular channel 46. Annular channel 46 may then be filled with a plastic molding material 60 to protect the portion of wires 53 and 54 not in channel 45. It is contemplated that, although the sensor and spark plug 24 remain separately mounted and loaded, a common connector could be designed and used for both.

In the operation of internal combustion engine 10, cylinder head lower wall 16 flexes in response to the varying load of combustion chamber pressure, with maximum movement at mounting boss 21. Cylinder head upper wall 20, however, remains relatively rigid. This load is thus transmitted to lower annular wall 32. Lower annular wall 32 is not significantly axially compressible, due to its comparative radial thickness. Thus the load is transferred through lower annular wall 32 to annular seat 33. From annular seat 33 the load is split between upper annular wall 31 and annular insert 37, both of which engage at their upper ends the rigid cylinder head upper wall 20. Annular load sensing element 40 is included in the axial load path through annular insert 37; and the proportion of the total axial load applied thereto depends on the relative compressibility of annular insert 37 and upper annular wall 31. Thus, annular load sensing element 40 provides a combustion chamber pressure signal that can be used to control engine functions. This arrangement provides an advantage over prior arrangements because the invention uses existing structures in internal combustion engines, and its operation does not depend on other parts also occupying those structures. It should also be noted that, since sensor 36 is located further from combustion chamber 12 than spark plug 24 and is in contact with annular wall 29, which may itself be in contact with coolant fluid, sensor 36 remains somewhat cooler than the lower portion of spark plug 24. Since lower annular wall 32 is not significantly axially compressible, it may be considered functionally and structurally as an extension of mounting boss 21 on cylinder head lower wall 16 for the purpose of engaging upper annular wall 31 and sensor 36. Lower annular wall 32, together with mounting boss 21 nd the remainder of cylinder head lower wall 16, forms a first wall which moves with varying combustion pressure in cylinder 12 and loads sensor 36 and upper annular wall 31 in response thereto against a relatively immovable second wall defined by upper wall 20 of cylinder head 15.

Referring now to FIG. 2, there is shown an embodiment of annular insert lower portion 39. Annular insert lower portion 39 starts with a thin annular extension 47 of annular insert upper portion 38 which passes radially inside annular load sensing element 40. Annular extension 47 ends in a radially outwardly extending flange 48 to define a groove 49 that retains annular load sensing element 40, ceramic insulators 56 and 57 and an annular retainer 61 made of incompressible steel. Flange 48 may be bent around the lower surface of retainer 61 by known cold forming processes after elements 56, 40, 57, and 61 are slipped over extension 47. In addition, annular extension 47 is relatively axially compressible compared with the remainder of annular insert 37 so that axial loads on annular insert 37 are applied to annular load sensing element 40; but it remains somewhat torsionally rigid to reduce torsional loads on annular load sensing element 40 during installation and removal of the sensor.

FIG. 3 illustrates an alternative embodiment of annular insert lower portion 39. Annular insert lower portion 39 has a thin annular extension 50 of annular insert upper portion 38 which passes radially inside annular load sensing element 40. Annular insert lower portion 39 in FIG. 3 also has an annular retainer 51. Annular extension 50 and annular retainer 51 have keys 52 engaged as shown in FIG. 4 to allow axial sliding motion but prevent relative rotation. Annular load sensing element 40 is thus retained for axial loading between annular retainer 51 and annular insert upper portion 38 with annular extension 50 and annular retainer 51 reducing torsional load on annular load sensing element 40.

By properly machining cylinder head 15, the time and cost of implementing sensor 36 is reduced. Normally, the spark plug well and boss are machined in two steps. In the first step, a tool machines the inner diameter of mounting boss opening 22, the top surface of spark plug seat 23, and, if required, the inner diameter of wall 29. In a second step, the threads of mounting boss opening 22 are tapped. For the manufacture of an engine equipped with a sensor according to this invention, the first step is amended so that the machining tool simultaneously machines the inner diameters of upper annular wall 31 and lower annular wall 32 as it machines the inner diameter of mounting boss opening 22 and further machines annular seat 33 of the shoulder between annular walls 31 and 32 simultaneously with spark plug seat 23. If the threads of annular insert 37 have the same pitch as those of spark plug 24, the second step may be modified by simultaneously tapping mounting boss opening 22 and upper wall portion 31 of annular wall 29. If the threads of annular insert 37 are given a finer pitch to decrease the torque required for full engagement of annular insert 37 with annular wall 29 for a more linear sensor output, the tapping will probably be accomplished in two operations. Otherwise, however, the preparation of engine 10 for the sensor of this invention requires only a change in tooling with no new machining steps.

It is intended that the invention not be limited to the embodiments described but that it have the full scope permitted by the language of the following claims.

The embodiments of the invention in which an exclusive property or privilege is claimed are defined as follows:

1. In an internal combustion engine having a combustion chamber, a housing component including a first wall having a mounting boss, a second wall spaced from the first wall and having an opening, and an annular wall joining the first and second walls and at least partly defining an access well from the second wall opening to the mounting boss, the first wall substantially defining at least one side of the combustion chamber and flexing in response to varying pressure therein, the second wall being relatively rigid and located away from direct exposure to combustion chamber pressure, and at least a portion of the annular wall being compressible in response to varying combustion chamber pressure, the improvement comprising:

a sensor including an annular insert and an annular load sensing element, the annular insert being engaged with the second wall within the access well to secure the sensor, the sensor being engaged with the first wall so as to axially load the annular load sensing element in parallel with the compressible portion of the annular wall.

2. An engine according to claim 1 wherein the first wall has an annular seat engaged by the sensor, and the annular insert has a first portion threadably engaging the second wall.

3. An engine according to claim 2 wherein the annular insert has a second portion axially engaging the annular seat and the annular load sensing element is axially retained between the first and second portions, the first and second portions further being engaged with each other to transfer torsional loads around the annular load sensing element.

4. An engine according to claim 3 wherein the second portion comprises a thinner annular extension of the first portion, the annular extension ending in a flange and defining a groove for the axial retention of the annular load sensing element, the annular extension being axially compressible so that axial loads on the annular insert are applied to the annular load sensing element but remaining torsionally rigid to reduce torsional loads on the annular load sensing element.

5. An engine according to claim 3 wherein the second portion comprises a thinner annular extension of the first portion and an annular retainer keyed to the annular extension thereby allowing relative axial motion while preventing relative rotational motion, the annular load sensing element being retained for axial loading between the annular retainer and the first portion with the annular extension and the annular retainer reducing torsional load on the annular load sensing element.

6. An engine according to claim 1 wherein the combustion chamber is a cylinder formed in a block, the housing component is a cylinder head, the cylinder head engages the block and closes an end of the cylinder, the mounting boss is a spark plug mounting boss, and the access well is a spark plug access well.

7. An engine according to claim 6 wherein the spark plug access well is primarily centrally located in the cylinder head with respect to the centerline of the cylinder.

8. An engine according to claim 1 wherein the annular load sensing element is a piezoelectric element, the piezoelectric element having electrically conductive electrodes on its upper and lower surfaces.

* * * * *